United States Patent [19]
Funaki et al.

[11] Patent Number: 5,798,172
[45] Date of Patent: Aug. 25, 1998

[54] STYRENIC RESIN COMPOSITION AND POLYSTYRENE ORIENTED FILM

[75] Inventors: Keisuke Funaki; Akihiko Okada; Takaaki Uchida, all of Ichihara, Japan

[73] Assignee: Idemitsu Petrochemical Co., Ltd., Tokyo, Japan

[21] Appl. No.: 682,570

[22] PCT Filed: Nov. 28, 1995

[86] PCT No.: PCT/JP95/02420

§ 371 Date: Jul. 29, 1996

§ 102(e) Date: Jul. 29, 1996

[87] PCT Pub. No.: WO96/17889

PCT Pub. Date: Jun. 13, 1996

[30] Foreign Application Priority Data

Dec. 7, 1994 [JP] Japan ................... 6-303650
Dec. 7, 1994 [JP] Japan ................... 6-303651

[51] Int. Cl.$^6$ ........................................ B32B 5/16
[52] U.S. Cl. ................ 428/327; 428/521; 525/227
[58] Field of Search ....................... 524/442, 443, 524/445, 447, 448, 502, 515, 577; 525/227, 232, 236, 237, 238, 240, 241; 428/327, 910, 521, 517, 519

[56] References Cited

U.S. PATENT DOCUMENTS

| | | | |
|---|---|---|---|
| 5,089,353 | 2/1992 | Negi et al. | 428/518 |
| 5,109,068 | 4/1992 | Yamasaki et al. | 525/151 |
| 5,127,158 | 7/1992 | Nakano | 29/849 |
| 5,145,950 | 9/1992 | Funaki et al. | 528/481 |
| 5,164,479 | 11/1992 | Funaki et al. | 528/502 |
| 5,166,238 | 11/1992 | Nakano et al. | 524/120 |
| 5,200,454 | 4/1993 | Nakano et al. | 524/409 |
| 5,219,940 | 6/1993 | Nakano et al. | 525/133 |
| 5,270,353 | 12/1993 | Nakano et al. | 523/214 |
| 5,321,056 | 6/1994 | Carson et al. | 523/201 |
| 5,326,813 | 7/1994 | Okada et al. | 524/508 |
| 5,346,950 | 9/1994 | Negi et al. | 525/57 |
| 5,352,727 | 10/1994 | Okada | 524/495 |
| 5,373,031 | 12/1994 | Funaki et al. | 522/3 |
| 5,391,611 | 2/1995 | Funayama et al. | 524/508 |
| 5,395,890 | 3/1995 | Nakano et al. | 525/165 |
| 5,418,275 | 5/1995 | Okada et al. | 524/504 |
| 5,436,397 | 7/1995 | Okada | 524/494 |
| 5,444,126 | 8/1995 | Okada et al. | 525/391 |
| 5,476,899 | 12/1995 | Funaki et al. | 524/577 |
| 5,518,817 | 5/1996 | Yamasaki et al. | 428/411.1 |
| 5,543,462 | 8/1996 | Okada et al. | 525/74 |

*Primary Examiner*—Vasu Jagannathan
*Assistant Examiner*—U. K. Rajguru
*Attorney, Agent, or Firm*—Oblon, Spivak, McClelland, Maier & Neustadt, P.C.

[57] ABSTRACT

The present invention relates to a styrenic resin composition which comprises 90 to 99.99% by weight of a styrenic polymer having a high degree of syndiotctic configuration (SPS) and 0.01 to 10% by weight of a spherical aluminosilicate having pH in the range of 5 to 11; a polystyrene oriented film which comprises the above styrenic resin composition molded into an oriented film; a styrenic resin composition which comprises 99.2 to 99.95% by weight of a styrenic polymer having a high degree of syndiotactic configuration and 0.05 to 0.8% by weight of a spherical regular elastomer having an average grain size in the range of 0.1 to 3 μm, and which has a melt index at 300° C. under 2.16 kg load being in the range of 1 to 50; and a polystyrene oriented film which comprises the above styrenic resin composition molded into an oriented film. According to the present invention, there are provided styrenic resin compositions each being excellent in melt-heat-stability, minimized in the generation of white powders at the time of continuous film forming and capable of producing oriented films that are favorable in slipperiness, dielectric breakdown voltage (AC), tear strength and the like; and polystyrene oriented films useful as a variety of base materials for films.

2 Claims, No Drawings

1

STYRENIC RESIN COMPOSITION AND POLYSTYRENE ORIENTED FILM

TECHNICAL FIELD

The present invention relates to a styrenic resin composition and a polystyrene oriented film. More particularly, it pertains to a styrenic resin composition useful for the material for an oriented film and to a polystyrene oriented film useful as various base materials such as base materials for capacitor films, self-adhesive tape films, electrically insulating films and package films.

BACKGROUND ART

A styrenic polymer having a syndiotactic configuration (hereinafter sometimes abbreviated to "SPS") is excellent in mechanical strength, heat resistance, external appearance, solvent resistance and the like and accordingly, is expected to find a variety of use. In particular, there are proposed extrusion technique for various films, sheets and fibers, molded products and purpose of use.

In general, the physical properties of an extrusion molded product vary widely depending on the material and molding process and molding conditions depend upon the characteristics of the material to be used and therefore, it is extremely important to develop the materials for molded products in order to develop excellent molded products.

Since film slipperiness is one of the most important characteristics in the development of an extremely thin film, there are proposed methods in which various inorganic particles are added, as anti-blocking agent, to a SPS film for the purpose of improving the slipperiness of the SPS. Such SPS films are disclosed in Japanese Patent Application Laid-Open Nos. 182346/1989, 74437/1991, 57013/1994, 57014/1994, 57015/1994, 57016/1994, 57017/1994, 64036/1994, 64037/1994, 65399/1994, 65400/1994, 65401/1994, 65402/1994, 80793/1994, 91748/1994, 91749/1994, 114924/1994 and 114925/1994.

Moreover in order to improve the dynamical physical properties of the SPS, a composition comprising the SPS and a rubber component is proposed and disclosed in Japanese Patent Application Laid-Open Nos. 146944/1989, 182344/1989, 182346/1989, 182350/1989 and 292049/1989.

However, when conventional inorganic grains are optionally added to the SPS, there have been caused the problem that the melt heat stability of the SPS is lowered and the problem that white powders are generated at the time of continuous produciton of SPS films. In addition, it has been difficult to produce a film excellent in both slipperiness and dielectric breakdown characteristics for AC.

Further, it has been a problem that when conventional inorganic grains are optionally added to the SPS, there is observed damage to the SPS film due to the falling off of the inorganic grains as the lubricant or the deterioration of the dynamical characteristics of the film. In addition, sufficient investigation has never been made on the slipperiness of the SPS film produced from the composition containing the SPS and a rubber component.

DISCLOSURE OF THE INVENTION

Under such circumstances intensive research and investigation have been made by the present inventors in order to solve the above-mentioned problems and thereby enable the production of a film excellent in slipperiness and tear strength as well as in moldability. As a result, it has been found that the deterioration of the film due to melt heat can been suppressed by the use of inorganic grains having a specific pH value a lubricant, also that the generation of white powders at the time of continuous production of films can be decreased by using inorganic grains having a specific chemical composition and further that a thin film having favorable slipperiness can be produced by adding a specific amount of inorganic grains having a specific grain size, a specific grain size distribution and a specific shape, while dynamical physical properties and electrical characteristics of the film are preserved.

On the basis of the above-mentioned finding and information, it has further been found that a resin composition which comprises specific materials and has a specific compositional ratio is excellent in melt heat stability, is minimized in the generation of white powders at the time of conrinuous production of films, and can provide an oriented film having favorable slipperiness and dielectric breakdown voltage (AC), whereby the present invention has been accomplished.

On the other hand, it has been found by the present inventors that an oriented film can be produced which is effective for controlling the morphology on the surface of and inside the film, can form protrusions without falling off and is excellent in both slipperiness and tear strength.

The present invention has been completed for the purpose of providing a material for an oriented film excellent in both slipperiness and tear strength by contriving to prevent the lubricant for the oriented film from falling off and to decrease the damage to the film on the basis of such finding and information.

That is to say, it is the first object of the present invention to provide a styrenic resin composition which comprises 90 to 99.99% by weight of a styrenic polymer having a high degree of syndiotactic configuration and 0.01 to 10%, preferably 0.01 to 5% by weight of a spherical aluminosilicate having pH in the range of 5 to 11.

The above-mentioned spherical aluminosilicate has an average grain size (D) in the range of preferably 0.1 to 3.0 μm, more preferably 0.3 to 2.0 μm, and contains at most 3%, preferably at most 2% by weight of the components having a grain size 3 times the average grain size (D). In addition, the aforesaid aluminosilicate has $Al_2O_3$ component in the range of preferably 0.2 to 50% by weight.

It is the second object of the present invention to provide a styrenic resin composition which comprises 99.2 to 99.95% by weight of a styrenic polymer having a high degree of syndiotactic configuration and 0.05 to 0.8%, preferably 0.1 to 0.8% by weight of a spherical regular elastomer having an average grain size in the range of 0.1 to 3 μm, and which has a melt index (MI) at 300° C. under 2.16 kg load being in the range or 1 to 50, preferably 5 to 30.

The above-mentioned spherical regular elastomer is the polymer of a monomer preferably selected from an alkyl acrylate, an alkyl methacrylate and a polyfunctional monomer having a double bond in the form of conjugated diolefin.

Moreover, the present invention provides a polystyrene oriented film which comprises the styrenic resin composition as the first object which is molded into an oriented film; and a polystyrene oriented film which comprises the styrenic resin composition as the second object which is molded into on oriented film.

THE MOST PREFERRED EMBODIMENT TO CARRY OUT THE INVENTION

In the first place some description will be given of the material for the styrenic resin composition according to the present invention.

The styrenic polymer having a syndiotactic configuration in the present invention means that its stereochemical structure is of syndiotactic configuration, i.e. the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of plural structural units continuously connected to each other, i.e., a diad in which two structural units are connected to each other, a triad in which three structural units are connected to each other and a pentad in which five structural units are connected to each other. "The styrenic polymers having a high degree of syndiotactic configuration" as mentioned in the present invention usually means polystyrene, poly(alkylstyrene), poly(halogenated styrene), poly(alkoxystyrene), poly(vinyl benzoate), hydrogenated polymer thereof, the mixture thereof, and copolymers containing the above polymers as main components, having such a syndiotacticity as determined by the above-mentioned method that the proportion of racemic diad is at least 75%, preferably at least 85%, or the proportion of racemic pentad is at least 30%, preferably at least 50%. Examples of the poly(alkylstyrene) include poly(methylstyrene), poly(ethylstyrene), poly(propylstyrene), poly(butylstyrene), poly(phenylstyrene), poly(vinylnaphthalene), poly(vinylstyrene) and poly(acenaphthylene). Examples of the poly(halogenated styrene) include poly(chlorostyrene), poly(bromostyrene) and poly(fluorostyrene). Examples of the poly(alkoxystyrene) include poly(methoxystyrene), and poly(ethoxystyrene).

The particularly desirable styrenic polymers are polystyrene, poly(p-methylstyrene), poly(m-methylstyrene), poly(p-tert-butylstyrene), poly(p-chlorostyrene), poly(m-chlorostyrene), poly(p-fluorostyrene) and the copolymer of styrene and p-methylstyrene. (Refer to Japanese Patent Application Laid-Open No. 187708/1987).

The comonomers in the styrenic copolymer are exemplified by the aforesaid monomer of the styrenic polymer, olefinic monomers such as ethylene, propylene, butene, hexene and octene, diolefinic monomers such as butadiene and isoprene, cyclic diolefinic monomers and polar vinyl monomers such as methyl methacrylate, maleic anhydride and acrylonitrile.

The molecular weight of the styrenic polymer to be used in the present invention is not specifically limited, but is preferably at least 10,000 and at most 3,000,000, more preferably at least 50,000 and at most 1,500,000 in terms of weight-average molecular weight. A weight-average molecular weight of less than 10,000 sometimes results in failure in sufficient orientation. The molecular-weight distribution, that is, the broadening of molecular weight of the styrenic polymer is not specifically limited as well, but may be in a wide range. It is preferable that a weight-average molecular weight (Mw)/a number-average molecular weight (Mn) ratio be at least 1.5 and at most 8. The styrenic polymer having such syndiotactic configuration is surpassingly superior to the conventional styrenic polymer having an atactic configuration in terms of heat resistance.

The styrenic resin composition as the first object of the present invention contains therein 90 to 99.99%, preferably 95 to 99.95% by weight of the above-mentioned styrenic polymer having a high degree of syndiotactic congifuration. Likewise, the styrenic resin composition as the second object of the present invention contains therein 99.2 to 99.95%, preferably 99.2 to 99.9% by weight of the above-mentioned styrenic polymer having a high degree of syndiotactic configuration.

In addition, the styrenic resin composition as the first object of the present invention contains 0.01 to 10%, preferably 0.01 to 5% by weight of the spherical aluminosilicate as an anti-blocking agent. The content of the spherical aluminosilicate less than 0.01% by weight results in insufficient slipperiness of the film, whereas that more than 10% by weight unfavorably leads to frequent breakage of the film at the time of orientation.

The aforesaid aluminosilicate, which is of amorphous form, is composed of aluminum silicate, kaolin and kaolinite as principle components, and more specifically, of inorganic components such as $Al_2O_3$ and $SiO_2$. By the term "spherical" is meant substantially spherical from in addition to truly spherical form. Non-spherical aluminosilicate brings about insufficient slipperiness after the resin composition is pocessed into a film, thus failing to provide an oriented film having favorable slipperiness. The spherical aluminosilicate has pH in the range of preferably 5 to 11 pH of less than 5 and that of more than 11 unfavorably cause deterioration due to melt heat.

In the styrenic resin composition as the first object of the present invention, the above-mentioned aluminosilicate has an average grain size (D) of preferably 0.1 to 3.0 µm, more preferably 0.3 to 2.0 µm. An average grain size (D) smaller than 0.1 µm results in insufficient slipperiness of the resultant film, whereas that larger than 3.0 µm unfavorably leads to the generation of white powders in the step of film forming.

In addition, the spherical aluminosilicate contains at most preferably 3%, more preferably 2% by weight of the components having a grain size 3 times the average grain size (D). When it contains more than 3% by weight of the components having a grain size 3 times the average grain size (D), white powders are unfavorably generated in the step of film forming.

Moreover, the aforestated spherical aluminosilicate has $Al_2O_3$ component in the range of preferably 0.2 to 50% by weight. An $Al_2O_3$ content therein exceeding 50% by weight unfavorably results in the feneration of white powders.

On the other hand, the styrenic resin composition as the second object of the present invention contains 0.05 to 0.8%, preferably 0.1 to 0.8% by weight of a spherical regular elastomer. The content thereof less than 0.05% by weight brings about insufficiency in both film slipperiness and tear strength of the film, whereas that more than 0.8% by weight unfavorably brings about insufficient tear strength of a thin film.

By the term "elastomer" to be used in the present invention is meant a material which is of a definite and regular form and has rubbery elesticity at around ordinary temperature. There are widely used, as an elastomer, acrylic polymers, polymers of diolefinic monomer, acrylonitrile-based polymers, copolymers of the foregoing and a material containing a synthetic rubber component, such as polyisobutylene, plyethylene and specific polyester. Preferable elastomers among them are those containing a polymer component of a monomer selected from an alkyl acrylate, an alkyl methacrylate and a polyfunctional monomer having a double bond of conjugated diolefin type. By the term "spherical" is meant substantially spherical form in addition to truly spherical form. An elastomer other than a spherical regular elastomer brings about insufficient slipperiness and the like after the resin composition is processed into a film, thus failing to provide an oriented film having favorable slipperiness.

The above-mentioned spherical regular elastomer has an average grain size of 0.1 to 3.0 μm, preferably 0.1 to 2.0 μm. An average grain size smaller than 0.1 μm causes insufficiency in slipperiness and tear strength of the resultant film, whereas that larger than 3.0 μm unfavorably brings about insufficient tear strength of a thin film.

The styrenic resin composition as the second object of the present invention has a melt index (MI) at 300° C. under 2.16 kg load being in the range of 1 to 50, preferably 5 to 30. An MI thereof less than 1 unfavorably brings about melt fracture and difficulty in extrusion molding, whereas that more than 50 unfavorably results in decrease in film strength.

The styrenic resin composittions as the first and second objects of the present invention comprise, as required, each an organic compound which has an —NH— group and a molecular weight of less than 10,000.

It is preferable that the organic compound having a —NH— group and a molecular weight of less than 10,000 be such that having an electron-attracting group adjacent to the —NH— group. It is preferable that such an electron-attracting group contains an aromatic ring such as benzene ring, naphthalene ring, anthracene ring, pyridine ring, triazine ring, indenyl ring and a derivative thereof or a carbonyl structure. The above-mentioned organic compound has preferably a thermal decomposition temperature of 260° C. or higher and is specifically exemplified, as a usable compound, by 2,4-bis(n-octylthio)-6-(4-hydroxy-3,5-di-tert-butylanilino)-1,3,5-triazine; N,N'-hexamethylenebis(3, 5-di-tert-butyl-4-hydroxy-hydrocinnamide); N,N'-bis 3-(3, 5-di-tert-butyl-hydroxyphenol)propionyl hydrazine; 3-(N-salicyloyl)amino-1,2,4-triazole; disalicyloylhydrazide decamethylenedicarboxylate; 2-phenoxypropionylhydrazide isophthalate; 2,2-oxamide-bis ethyl-3-(3,5-di-tert-butyl-4-hydroxyphenyl)propionate; oxalyl-bis(benzylidene-hydrazide); N-formyl-N'-salicyloylhydrazine; 2-mercaptobenzimidazole; N,N'-di-2-naphthyl-p-phenylenediamine; 4,4'-bis(α,α-dimethylbenzyl)diphenylamine; 2-mercaptomethylbenzimidazole; styrenated diphenylamine; octylated diphenylamine; N-phenyl-1-naphthylamine; poly(2,2,4-trimethyl-1,2-dihydroxyquinoline; 6-ethoxy-1,2-dihydro-2,2,4-trimethylquinoline; N,N'-diphenyl-p-phenylenediamine; N-phenyl-N'-(1,3-dimethylbutyl)-p-phenylenediamine; N-phenyl-N'-(3-methacryloxy-2-hydroxypropyl)-p-phenylenediamine; thiodiphenylamine; p-aminodiphenylamine; N-salicyloyl-N'-aldehydehydrazine; N-salicyloyl-N-acetylhydrazine; N,N'-diphenyl-oxamide; N,N'-di(2-hydroxyphenyl)oxamide; 6-ethoxy-2,2,4-trimethyl-1,2-dihydroquinoline; and N-phenyl-N'-isopropyl-p-phenylenediamine.

The above-mentioned organic compound having a —NH— group and a molecular weight of less than 10,000 is contained in the polystyrene oriented film of the present invention when necessary in an amount of less than 30% by weight.

The styrenic resin composition according to the present invention may further be incorporated with a lubricant, other thermoplastic resin, an antioxidant, an inorganic filler, rubber, a compatibilizing agent, a colorant, a flame retardant, a crosslinking agent, a crosslinking aid, a nucleating agent, a plasticizer and the like to the extent that the object of the present invention is not impaired therby.

As other inorganic fine grains usable in combination with the spherical aluminosilicate according to the present invention or inorganic fine grains usable as a lubricant in combination therewith, mention is made of an oxide, a hydroxide, sulfide, nitride, halogenide, carbonate, sulfate, acetate, phosphate, phosphite, an organocarboxylate, a silicate, titanate and borate each of an element belonging to the group IA, IIA, IVA, VIA, VIIA, VIII, IB, IIB, IIIB or IVB, a hydrated compound thereof, a composite compound composed principally thereof, and natural mineral particles.

Specific examples of the inorganic fine grains include a compound of a group IA element such as lithium fluoride and borax (sodium borate hydrate); a compound of a group IIA element such as magnesium carbonate, magnesium phosphate, magnesium oxide(magnesia), magnesium chloride, magnesium acetate, magnesium fluoride, magnesium titanate, magnesium silicate, magnesium silicate hydrate(talc), calcium carbonate, calcium phosphate, calcium phosphate, calcium sulfate(gypsum), calcium acetate, calcium terephthalate, calcium hydroxide, calcium silicate, calcium fluoride, calcium titanate, strontium titanate, barium carbonate, barium phosphate, barium sulfate and barium phosphate; a compound of a group IVA element such as titanium dioxide (titania), titanium monoxide, titanium nitride, zirconium dioxide (zirconia) and zirconium monoxide; a compound of a group VIA element such as molybdenum dioxide, molybdenum trioxide and molybdenum sulfide; a compound of a group VIIA element such as manganese chloride and manganese acetate; a compound of a group VIII element such as cobalt chloride and cobalt acetate; a compound of a group IB element such as cuprous iodide; a compound of a group IIB element such as zinc oxide and zinc acetate; a compound of a group IIIB element such as aluminum oxide (alumina), aluminum hydroxide and aluminum fluoride; a compound of a group IVB element such as silicon oxide (silica, silica-gel), graphite, carbon and glass; and a natural mineral such as carnallite, kernite, mica (phlogopite) and pyrolusite, each in the form of particle.

The average particle diameter of the inorganic fine grains to be used other than aluminosilicate is not specifically limited, but is preferably 0.01 to 3 μm, and the content in a molded article is 0.001 to 5% by weight, preferably 0.001 to 3% by weight, more preferably 0.005 to 3% by weight, particularly preferably 0.005 to 2% by weight. The inorganic fine grains are finally contained in a molded article without any limitation to the method of incorporating the grains therein. There are available a method in which the grains are added or deposited in an optional step during the polymerization and a method in which the grains are added in an optional step during melt extrusion.

There are available a variety of other thermoplastic resins that may be added to the above-mentioned styrenic polymer in the present invention. Such resins are exemplified by a styrenic polymer having an atactic configuration, a styrenic polymer having an isotactic configuration and a polyphenylene ether. The above-exemplified resins are easily compatible with the aforestated styrenic polymer having the syndiotactic configuration, effective in controlling the crystallization at the time of preparing a preform for orientation, and thereafter enhance the orientation property of the preform, facilitate the orientation conditions and thus enable to produce a film having excellent dynamic properties. In the case where a styrenic polymer having an atactic and/or an isotactic configuration is incorporated, it is preferable that the aforesaid styrenic polymer be composed of the styrenic monomer same as that for the styrenic polymer having the syndiotactic configuration. The amount of the compatible resin components to be contained in the styrenic polymer may be 1 to 70% by weight, especially 2 to 50% by weight.

An amount thereof exceeding 70% by weight unfavorably impaires, as the case may be, the heat resistance which is an advantage of a styrenic polymer having the syndiotactic configuration.

Examples of incompatible resin which can be added as other resin to the above-mentioned styrenic polymer to be used in the present invention include a polyolefin such as polyethylene, polypropylene, polybutene and polypentene; a crystalline polyester such as polethylene terephthalate, polybutylene terephthalate and polyethylene naphthalate; a polyamide such as nylon 6 and nylon 6,6; a polythioether such as polyphenylene sulfide; polycarbonate; polysulfone; polyetheretherketone; polyether sulfone; polyimide; a halogenated vinylic polymer such as teflon; poly(vinyl alcohol), that is, all resins other than the above-mentioned compatible resins; and a crosslinked resin containing the above-mentioned compatible resins. The above-exemplified resins are incompatible with the styrenic polymer having the syndiotactic configuration according to the present invention and accordingly, when contained in a small amount therein, enable themselves to be dispersed in said styrenic polymer just like islands and are effective in imparting favorable gloss to the polymer after orientation and in improving the surface slipperiness. The amount of the incompatible resin components to be contained is preferably 2 to 50% by weight for the purpose of imparting gloss, in the case of the styrenic resin composition as the first object of the present invention, and preferably 0.001 to 5% by weight for the purpose of controlling the surface properties. It is preferable, in the case of a high working temperature as a product, to employ a relatively heat-resistant incompatible resin.

Examples of usable antioxidant include a phosphorus-based antioxidant, a phenolic antioxidant and a sulfur-based antioxidant. By the use of such an antioxidant, a styrenic resin composition having excellent heat stability is obtained.

There are available a variety of phosphorus-based antioxidants including a monophosphite and diphosphite. Examples of the monophosphite include tris(2,4-di-tert-butylphenyl) phosphite and tris(mono/di-nonylphenyl) phosphate. The diphosphite to be used is represented by the general formula

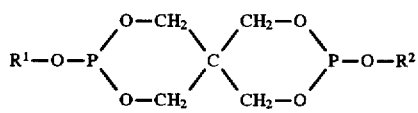

where $R^1$ and $R^2$ may be the same as or different from each other and are each an alkyl group having 1 to 20 carbon atoms, a cycloalkyl group having 3 to 20 carbon atoms or an aryl group having 6 to 20 carbon atoms. Specific examples thereof include distearyl pentaerythritol diphosphite; dioctyl pentaerythritol diphosphite; diphenyl pentaerythritol diphosphite; bis(2,4-di-tert-butylphenyl) pentaerythritol diphosphite; bis(2,6-di-tert-butyl-4-methylphenyl) pentaerythritol diphosphite, dicyclohexyl pentaerythritol diphosphite; tris(2,4-di-tert-butylphenyl) phosphite; tetrakis (2,4-di-tert-butylphenyl)-4,4'-biphenylene phosphite. Of these are preferably usable bis(2,4-di-tert-butylphenyl) pentaerythritol diphosphite; bis(2,6-di-tert-butyl-4-methylphenyl) pentaerythrytol diphosphite; tris(2,4-di-tert-butylphenyl) phosphite; and tetrakis(2,4-di-tert-butylphenyl)-4,4'-biphenylene phosphite.

There are also usable a variety of phenolic antioxidants, which are exemplified by dialkylphenol, trialkylphenol, diphenylmonoalkoxyphenol and tetraalkylphenol.

Examples of dialkylphenol include 2,2'-methylenebis(6-tert-butyl-4-methylphenol); 1,1-bis(5-tert-butyl-4-hydroxy-2-methylphenyl)butane; 2,2'-methylenebis(4-methyl-6-cyclohexylphenol); 4,4'-thiobis(6-tert-butyl-3-methylphenol); and 2,2-bis(5-tert-butyl-4-hydroxy-2-methylphenol)-4-n-dodecylmercapto-butane. Examples of trialkylphenol include 2,6-di-tert-4-methylphenol; 2,2'-methylenebis(6-tert-butyl-4-ethylphenol); 2,2'-methylenebis 4-methyl-6-(α-methylcyclohexyl)phenol; 2,2'-methylenebis(4-methyl-6-nonylphenol); 1,1,3-tris-(5-tert-butyl-4-hydroxy-2-methylphenyl)butane; ethyleneglycol-bis 3,3-bis(3-tert-butyl-4-hydroxyphenyl) butyrate; 1-1-bis(3,5-dimethyl-2-hydroxyphenyl)-3-(n-dodecylthio)-butane; 1,3,5-tris(3,5-di-tert-buty-4-hydroxybenzyl)-2,4,6-trimetylbenzene; 2,2-bis(3,5-di-tert-butyl-4-hydroxybenzyl)dioctadecyl malonate ester; n-octadecyl-3-(4-hydroxy-3,5-di-tert-butylphenyl) propionate; tetrakis methylene(3,5-di-tert-butyl-4-hydroxyhydrocinnamate) methane; 3,9-bis 1,1-dimetyl-2-(β-(3-tert-butyl-4-hydroxy-5-methylphenyl)propionyloxy) ethyl-2,4,8,10-tetroxaspiro 5,5 undecane; and tris-(3,5-di-tert-butyl-4-hydroxybenzyl)isocyanurate. Examples of diphenylmonoalkoxyphenol include 2,6-diphenyl-4-methoxyphenol. Examples of tetraalkylphenol include tris-(4-tert-butyl-2,6-di-methyl-3-hydroxybenzyl)-isocyanurate.

The sulfur-based antioxidant is preferably thioether-based, and is specifically exemplified by dilauryl-3,3'-thiodipropionate; dimyristyl-3,3'-thiodipropionate; distearyl-3,3'-thiodipropionate; pentaerythritol-tetrakis-(lauryl-thiopropionate) bis 2-methyl-4-(3-n-alkylthiopropionyloxy)-5-tert-butylphenyl sulfide; and 2-mercaptobenzimidazole. Of these pentaerythritol-tetrakis-(lauryl-thiopropionate) is particularly preferable.

The styrenic resin composition according to the present invention which comprises the above-mentioned materials can be produced by an arbitrary method, that is, any of the various methods that are used for the conventional thermoplastic resins. Applicable production methods include, for example, a method in which the styrenic polymer having the syndiotactic configuration (A) and the spherical aluminosilicate (B) are mixed and melt kneaded by means of an extruder or the like, a method in which the component (B) is added in any stage of the production step of the component (A) and a method in which a mixture of the components (A) and (B) along with the component (A) are melt kneaded.

A molded article formed by the use of the styrenic resin composition of the present invention exhibits excellent effect irrespective of its form or shape, and the composition is applied, for example, to films, sheets, fibers, yarns, pipes, trays, three-dimensional molded articles to be formed by injection molding and the like. In particular, the application of the aforesaid styrenic resin composition to the production of oriented films, can afford an oriented film which is minimized in the generation of white powder at the time of continuous production of films and which is favorable in slipperiness, dielectric breakdown voltage (AC) and tear strength with minimized surface defect.

In the case of producing a sheet by the use of the styrenic resin composition of the present invention, conventional extrusion molding or the like may be applied to the production. A suitable temperature of heat melting in the above case ranges from 270° to 350° C. In addition, the sheet thus obtained may be subjected to a heat treatment at a temperature between the glass transition temperature and the melting point.

Likewise, in the case of producing, for example, an oriented film by using the styrenic resin composition of the present invention the production method is not specifically limited. The objective film is obtained by heat melting the raw material, then making a preform, heat orientating the resultant preform and when necessary, heat treating the orientated film.

In the following, some description will be given of the polystyrene oriented film according to the present invention, which film is formed by molding the above-mentioned styrenic resin composition.

The procedures from the above-mentioned heat melting to heat setting in the case of producing the polystyrene oriented film will be specifically explained in the following. Firstly, the styrenic resin composition thus obtained as the raw material for molding is usually extrusion molded to form a preform for orientation (film, sheet or tube). In this molding, the heat-melted raw material for molding is generally molded to a prescribed shape by means of an extruder, but the raw material for molding may be molded in a softened state without being heat melted. The extruder to be employed may be any of a single screw extruder and a twin screw extruder each with or without a vent. The use of a proper filter or mesh in an extruder enables the removal of unexpected impurities and foreign matters. The filter may suitably be selected in the form of flat plate, cylinder or the like. The extrusion condition is not specifically limited but may be suitably selected according to the various situations. The preferable extrusion conditions however, include an extrusion temperature ranging from the melting point of the raw material to the temperature 50° C. higher than the degradation temperature of the same and a shear stress of $5 \times 10^6$ dyne/cm$^2$ or less. As a die to be used, mention may be made of a T-die, torus die and the like.

After the above-mentioned extrusion molding, the preform for orientation thus obtained is cooled for solidification by the use of a refrigerant such as gas, liquid, metallic roll or the like. In the case where a metallic roll is used, the application of an air knife, air chamber, touch roll or electrostatic pinning is effective in preventing unevenness in thickness and waviness of the film.

The cooling solidification is carried out usually at a temperature ranging from 0° C. to the temperature 30° C. higher than the glass transition temperature of the preform for orientation, preferably ranging from the temperature 70° C. lower than the above glass transition temperature to the above glass transition temperature. The cooling rate is usually selected in the range of 200° to 3° C. per second.

In the case where the cooled and solidified preform is biaxially oriented to form films, the biaxial orientation may be carried out simultaneously in the machine and transverse directions or successively in the optional order, and may be effected in single stage or multi-stage. The draw ratio in terms of area ratio is 2 or more, preferably 3 or more. The draw ratio in the above range can produce the film having favorable physical properties such as a crystallinity of 25% or higher.

There are available a variety of orientation methods, which include the method by a tenter, roll-orientation method, bubbling method by the use of pneumatic pressure, rolling method, etc., each of which may be suitably selected or combined with another. The orientation temperature may be usually set in the range of the glass transition temperature of the preform to the melting point thereof. The orientation rate is generally $1 \times 10^5\%$ to $1 \times 10^5\%$ per minute, preferably $1 \times 10^3\%$ to $1 \times 10^5\%$ per minute. The oriented film obtained under the foregoing conditions is preferably subjected to heat setting when dimensional stability at a elevated temperature, heat resistance or balanced strength inside the film is required according to the purpose of use. The heat setting may be performed by the conventional method, for example, by a method wherein the oriented film is maintained for 0.5 to 120 seconds at a temperature ranging from the glass transition temperature of the film to the melting point thereof, preferably ranging from the temperature 100° C. lower than the melting point thereof to the temperature slightly lower than the melting point thereof under the condition of tension, non-tension or limited contraction. In addition, the heat setting can be carried out twice or more under different conditions within the above-described ranges, and may be effected in an atmosphere of an inert gas such as argon gas, nitrogen gas, or the like.

The polystyrene oriented film of the present invention which is produced in the above-mentioned manner is that excellent in slipperiness, dielectric breakdown voltage, as well as tear strength by virtue of the formation of suitable protrusion without falling off.

In the following, the present invention will be described in more detail with reference to working examples, which however, shall not be construed to limit the present invention thereto.

REFERENCE EXAMPLE 1

In a 500 milliliter (hereinafter abbreviated to mL) glass vessel which had been purged with argon were placed 17 g (71 mmol) of copper sulfate pentahydrate (CuSO$_4$ 5H$_2$O), 200 mL of toluene and 24 mL (250 mmol) of trimethylaluminum, which were then reacted at 40° C. for 8 hours. Subsequently, the solids were separated from the reaction mixture to obtain 6.7 g of a contact product. The molecular weight thereof as determined by the freezing point depression method was 610.

PREPARATION EXAMPLE 1

(Preparation of styrenic polymer having a syndiotactic configuration)

In a 2 liter (hereinafter abbreviated to "L") reaction vessel were placed the contact product as obtained in the above Reference Example 1 in an amount of 7.5 mmol as aluminum atom, 7.5 mmol of triisobutylaluminum, 0.038 mmol of pentamethylcyclopentadienyltitanium trimethoxide and 1 L of purified styrene, which were then subjected to polymerization reaction at 90° C. for 5 hours. After the completion of the reaction, the catalytic components were decomposed with a solution of sodium hydroxide in methanol and then the reaction product was washed with methanol repeatedly and dried to afford 466 g of polymer. As the result of analysis by gel permeation chromatography using 1,2,4-trichlorobenzene at 130° C. as the solvent, the polymer thus produced had a weight-average molecular weight of 290,000 and a ratio of weight-average molecular weight to number-average molecular weight of 2.72.

It was confirmed that the polymer thus obtained was polystyrene having a syndiotactic configuration from the results of melting point measurement and $^{13}$C-NMR analysis using carbon isotope.

EXAMPLES 1 TO 5 AND COMPARATIVE EXAMPLES 2 TO 5

To the styrenic polymer having a syndiotactic configuration which had been obtained in the Preparation Example 1 was added each of the inorganic grains as illustrated in Table 1 whose types and properties are described also in Table 1 in amounts shown in the table, and the resultant composition was mixed in the form of powder, melt extruded at 300° C. and made into pellet. The material thus obtained was melt extruded at an average temperature of 290° C. for a retention time of 30 minutes, followed by cooling to prepare a raw fabric sheet. Then, measurements were made of the melt index at 300° C. under 2.16 kg load of the pellet and the raw fabric sheet, and the hue of the raw fabric sheet was visually observed.

Subsequently, the sheet was oriented in machine direction at 110° C. at a draw ratio of 3.0 and then further oriented in transverse direction at 120° C. at a draw ratio of 3.0, followed by a heat treatment at 230° C. During the final winding step of the continuous film forming, the film was passed through a pair of rubber rolls, and observation was made of the generation of white powders.

Measurements were made of the friction coefficient of the resultant oriented film according to ASTM D-1984, and of the dielectric breakdown voltage thereof according to JIS C-2330.

The results obtained are given in Table 2.

COMPARATIVE EXAMPLE 1

The procedure in Example 1 was repeated except that the addition of the inorganic grains was omitted. The results obtained are given in Table 2.

TABLE 1

| | Type of inorganic grains | Properties | $Al_2O_3$ content (%) | Average grain size D(μm) | Components of (3 × D) (%) | pH | Addition amount (wt %) |
|---|---|---|---|---|---|---|---|
| Example No. | | | | | | | |
| 1 | alminosilicate | spherical | 42 | 1.5 | 1.0 | 9.5 | 0.1 |
| 2 | alminosilicate | spherical | 42 | 0.8 | 1.5 | 9.5 | 0.5 |
| 3 | alminosilicate | spherical | 42 | 0.8 | 1.5 | 9.5 | 3.0 |
| 4 | alminosilicate | spherical | 0.2 | 1.5 | 1.0 | 5.5 | 0.5 |
| 5 | alminosilicate | spherical | 26 | 1.2 | 1.0 | 10.6 | 0.5 |
| Comp. Example No. | | | | | | | |
| 1 | — | spherical | — | — | — | — | 0 |
| 2 | alminosilicate | spherical | 42 | 1.5 | 1.0 | 9.5 | 15 |
| 3 | silica | spherical | 0.1 | 1.6 | 0 | 7 | 0.5 |
| 4 | silica | spherical | 0.12 | 1.6 | 3.5 | 7 | 0.5 |
| 5 | alminosilicate | spherical | 42 | 1.2 | 1.0 | 11.5 | 0.5 |

Remarks: Comp. is Comparative

TABLE 2

| | Moldability | | | Film | |
|---|---|---|---|---|---|
| Example No. | MI increase rate (%) | Hue | White powder generation | Static friction coefficient (μm) | Dielectric breakdown voltage(KV/mm, AC) |
| 1 | 1.6 | colorless | none | 0.6 | 280 |
| 2 | 1.7 | colorless | none | 0.4 | 275 |
| 3 | 1.8 | colorless | none | 0.3 | 268 |
| 4 | 1.7 | colorless | none | 0.4 | 273 |
| 5 | 1.8 | colorless | none | 0.4 | 274 |

| | Moldability | | | Film | |
|---|---|---|---|---|---|
| Comp. Example No. | MI increase rate (%) | Hue colorless | White powder generation | Static friction coeffeicient (μm) | Dielectric breakdown voltage(RV/mm, AC) |
| 1 | 1.5 | colorless | none | 1.0 | 285 |
| 2 | 2.3 | pale yellow | yes | 0.3 | 215 |
| 3 | 1.8 | colorless | yes | 0.4 | 240 |
| 4 | 1.8 | colorless | yes | 0.4 | 230 |
| 5 | 2.2 | pale yellow | none | 0.4 | 245 |

Remarks: Comp. is Comparative

EXAMPLES 6 TO 9 AND COMPARATIVE EXAMPLES 7 TO 9

To the styrenic polymer having a syndiotactic configuration which had been obtained in the Preparation Example 1 was added each of the spherical regular elastomers as illustrated in Table 3 whose types and properties are described also in Table 3 in amounts shown in the table, and the resultant composition was mixed in the form of powder, melt extruded at 300° C. and made into pellet, which had a melt index at 300° C. under 2.16 kg load being 10. The material thus obtained was melt extruded at an average temperature of 290° C., followed by cooling to prepare a raw fabric sheet.

Subsequently, the sheet was oriented in machine direction at 110° C. at a draw ratio of 3.0 and then further oriented in transverse direction at 120° C. at a draw ratio of 3.0, followed by a heat treatment at 230° C. In addition, an observation was made of the generation of white powders on the surface of the rolls in the continuous film forming step.

An observation was made of the surfaces of the resultant oriented film of 10 μm in thickness by means of a microscope to confirm whether or not the lubricant had fallen off and the film had been damaged. In addition, measurements were made of the friction coefficient of the resultant film according to ASTM D-1984, and of the tear strength thereof according to ASTM D-1922.

The results obtained are given in Table 4.

COMPARATIVE EXAMPLE 6

The procedure in Example 6 was repeated except that the addition of the spherical regular elastomer was omitted. The results obtained are given in Table 4.

TABLE 3

|  | Type of elastomer | Properties | Average grain size (μm) | Addition amount (wt %) |
|---|---|---|---|---|
| Example No. | | | | |
| 6 | MAS[1] | spherical | 0.5 | 0.5 |
| 7 | MAS[1] | spherical | 0.5 | 0.2 |
| 8 | MBS[2] | spherical | 0.4 | 0.5 |
| 9 | MASS[3] | spherical | 0.3 | 0.5 |
| Comp. Example No. | | | | |
| 6 | — | — | — | — |
| 7 | silica[4] | spherical | 1.0 | 0.5 |
| 8 | MAS[1] | spherical | 0.5 | 5.0 |
| 9 | SBR[5] | irregular | 1.2 | 0.5 |

Remarks: Comp. is Comparative
[1] MAS: produced by Rohm and Hass Co., Ltd. EXL-2330
[2] MBS: produced by Mitsubishi Rayon Engineering Co., Ltd. C-223
[3] MBS: produced by Mitsubishi Rayon Engineering Co., Ltd. S-2001
[4] Silica: produced by Nippon Shokubai Kagaku Kogyo Co., Ltd. KEP-100
[5] SBR: produced by Shell Kagaku Co., Ltd. TR-1102

TABLE 4

| | Moldability | Film | | |
|---|---|---|---|---|
| | White powder generation | Lubricant falling off or surface defect | Static friction coefficient | Tear strength (kgf/mm) |
| Example No. | | | | |
| 6 | none | none | 0.5 | 3.5 |
| 7 | none | none | 0.6 | 3.2 |
| 8 | none | none | 0.5 | 3.4 |
| 9 | none | none | 0.5 | 3.6 |
| Comp. Example No. | | | | |
| 6 | none | surface defect | 1.0 | 1.8 |
| 7 | yes | yes (both) | 0.3 | 1.4 |
| 8 | none | none | 0.3 | 1.9 |
| 9 | none | none | 0.8 | 2.2 |

Remarks: Comp. is Comparative

INDUSTRIAL APPLICABILITY

As described hereinbefore, the styrenic resin composition according to the present invention is excellent in melt-heat stability, minimized in the generation of white powders at the time of continuous film forming and preferably used as a material for an oriented film; and besides makes it possible to produce an oriented film which exerts extremely excellent effect on the prevention of the falling off of the lubricant for the oriented film and on the decrease in the damage to the film.

Moreover, the polystyrene oriented film of the present invention has favorable performance in slipperiness and dielectric breakdown voltage (AC) and also in both slipperiness and tear strength. Accordingly, such oriented film is favorably used as various base materials for capacitor film, self-adhesive tape film, electrically insulating film and package films, thereby rendering itself highly valuable with regard to industrial utilization.

We claim:

1. A styrenic resin composition which comprises 99.2 to 99.95% by weight of a styrenic polymer having a syndiotactic configuration and 0.05 to 0.8% by weight of a spherical regular elastomer having an average grain size in the range of 0.1 to 3 μm and which has a melt index at 300 C under 2.1 kg load being in the range of 1 to 50, wherein said spherical regular elastomer is the polymer of a monomer selected from an alkyl acrylate, an alkyl methacrylate and a polyfunctional monomer having a double bond in the form of conjugated diolefin.

2. A polystyrene oriented film which comprises the styrenic resin composition as set forth in claim 1 which is molded into an oriented film.

* * * * *